(12) United States Patent
Chen et al.

(10) Patent No.: US 10,888,939 B2
(45) Date of Patent: Jan. 12, 2021

(54) MITER SAW

(71) Applicant: Nanjing Chervon Industry Co., Ltd., Nanjing (CN)

(72) Inventors: Zhifeng Chen, Nanjing (CN); Yinglu Ai, Nanjing (CN); Guigong Ni, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 16/572,782

(22) Filed: Sep. 17, 2019

(65) Prior Publication Data
US 2020/0139462 A1 May 7, 2020

(30) Foreign Application Priority Data

Nov. 6, 2018 (CN) .................. 2018 2 1821979 U
Nov. 6, 2018 (CN) .................. 2018 2 1822209 U

(51) Int. Cl.
| | |
|---|---|
| *B23D 59/00* | (2006.01) |
| *B27B 27/06* | (2006.01) |
| *B27B 27/08* | (2006.01) |
| *B23D 45/04* | (2006.01) |
| *B27G 5/02* | (2006.01) |

(52) U.S. Cl.
CPC ............ *B23D 59/006* (2013.01); *B27B 27/06* (2013.01); *B27B 27/08* (2013.01); *B23D 45/042* (2013.01); *B23D 45/048* (2013.01); *B27G 5/02* (2013.01)

(58) Field of Classification Search
CPC .. B23D 59/006; B23D 45/042; B23D 45/048; B27B 27/06; B27B 27/08; B27G 5/02; B27G 19/02
See application file for complete search history.

(56) References Cited

U.S. PATENT DOCUMENTS

| | | | | |
|---|---|---|---|---|
| 9,975,268 | B2* | 5/2018 | Martin | B27B 9/02 |
| 10,703,017 | B2* | 7/2020 | Merck | B28D 7/02 |
| 2007/0163409 | A1* | 7/2007 | Nishikawa | B23D 59/006 83/485 |
| 2008/0209739 | A1* | 9/2008 | Saitoh | B23D 59/006 30/124 |
| 2008/0216627 | A1* | 9/2008 | Taylor | B23D 45/048 83/468.3 |
| 2009/0031875 | A1* | 2/2009 | Ushiwata | B23D 59/006 83/471.3 |
| 2009/0183377 | A1* | 7/2009 | Loveless | B23D 59/006 30/390 |

(Continued)

*Primary Examiner* — Sean M Michalski
(74) *Attorney, Agent, or Firm* — Greenberg Traurig, LLP

(57) ABSTRACT

A miter saw that includes a base, a worktable arranged on the base and defining a worktable plane, and a cutting head formed with or connected to an operating member operable by a user. The cutting head further includes a circular saw blade operative to rotate around a first axis and a motor operative to drive the circular saw blade. A fence is arranged on the worktable. The cutting head is further connected to a first guiding member configured for guiding chips to be discharged. The fence is formed with a guiding portion. The cutting head is operative to rotate around a second axis parallel to the worktable plane and, when the cutting head rotates around the second axis, the guiding portion is operative to guide the first guiding member to cross the fence.

20 Claims, 14 Drawing Sheets

(56) References Cited

U.S. PATENT DOCUMENTS

| | | | | |
|---|---|---|---|---|
| 2009/0235794 A1* | 9/2009 | Inai | B23D 45/042 | 83/397 |
| 2009/0288533 A1* | 11/2009 | Meredith | B23D 59/006 | 83/168 |
| 2010/0058911 A1* | 3/2010 | Goddard | B23Q 11/06 | 83/478 |
| 2010/0307307 A1* | 12/2010 | Butler | B23D 59/006 | 83/58 |
| 2014/0260848 A1* | 9/2014 | Gantke | B26D 7/1863 | 83/24 |
| 2015/0209975 A1* | 7/2015 | Kimura | B27B 5/32 | 83/471.2 |
| 2015/0375313 A1* | 12/2015 | Kani | B23D 47/025 | 83/471.2 |
| 2016/0368166 A1* | 12/2016 | Numata | B28D 7/02 | |
| 2017/0197285 A1* | 7/2017 | Dragan | B23D 59/006 | |
| 2018/0133819 A1* | 5/2018 | Yamamura | B23D 59/006 | |

* cited by examiner

MITER SAW

RELATED APPLICATION INFORMATION

This application claims the benefit under 35 U.S.C. § 119(a) of Chinese Patent Application No. CN 201821822209.6, filed on Nov. 6, 2018, and Chinese Patent Application No. CN 201821821979.9, filed on Nov. 6, 2018, each of which is incorporated herein by reference in its entirety.

TECHNICAL FIELD

The present disclosure relates to a miter saw.

BACKGROUND

A miter saw, as a cutting tool capable of obliquely cutting a workpiece, is becoming increasingly popular. The miter saw typically includes a base, a worktable, a cutting head, and the like. In an existing miter saw, the cutting head may produce large amounts of chips during a cutting operation, leaving a big impact on the working environment as well as user experience. In the related art, an external dust collector or a dust collection system built in the cutting tool are neither able to well solve the above problem. In particular, during the operation of the dust collection system built in the cutting tool, accessories in the dust collection system may be unable to cross the fence thus leading to incomplete dust collection.

SUMMARY

In one aspect of the disclosure, a miter saw includes: a base; a worktable arranged on the base and defining a worktable plane; a cutting head, formed with or connected to an operating member operable by a user, where the cutting head further includes a circular saw blade operative to rotate around a first axis and a motor operative to drive the circular saw blade; and a fence, arranged on the worktable. The cutting head is further connected to a first guiding member configured for guiding chips to be discharged. The fence is formed with a guiding portion. The cutting head is operative to rotate around a second axis parallel to the worktable plane, and when the cutting head rotates around the second axis, the guiding portion is operative to guide the first guiding member to cross the fence.

A roller arranged at the rear end of the guiding portion cooperates with the guiding portion formed on the fence, thereby enabling the guiding portion to easily cross the fence, which facilitates the operation by the user. The above design effectively increases the dust collecting efficiency.

DETAILED DESCRIPTION

Figure 1:
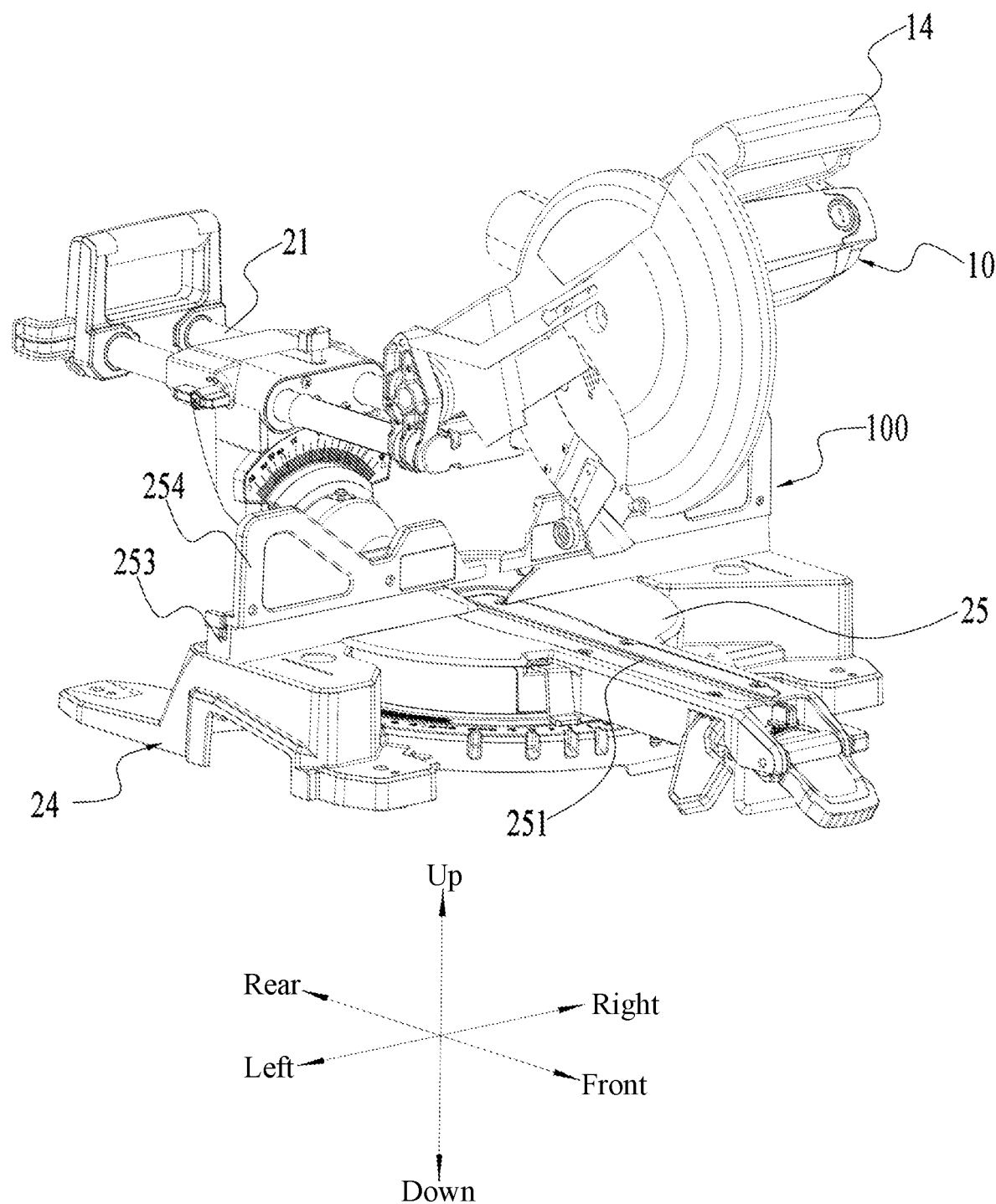
FIG. 1 is a perspective view of an example miter saw.

FIG. 1 shows an example miter saw 100. The miter saw 100 includes a body 20 and a cutting head 10. The body 20 includes a base 24 and a worktable 25.

The base 24 is used for supporting the worktable 25, i.e., for supporting the whole miter saw 100. The whole miter saw 100 may be placed stably on the ground or an operating plane by the base 24. To illustrate technical solutions in the example embodiment clearly, a front side direction, a rear side direction, a left side direction, a right side direction, an upper side direction and a lower side direction are defined as shown in FIG. 1. The worktable 25 is disposed on the base 24 and defines a horizontal worktable plane 105 for placing a workpiece.

Figure 2:
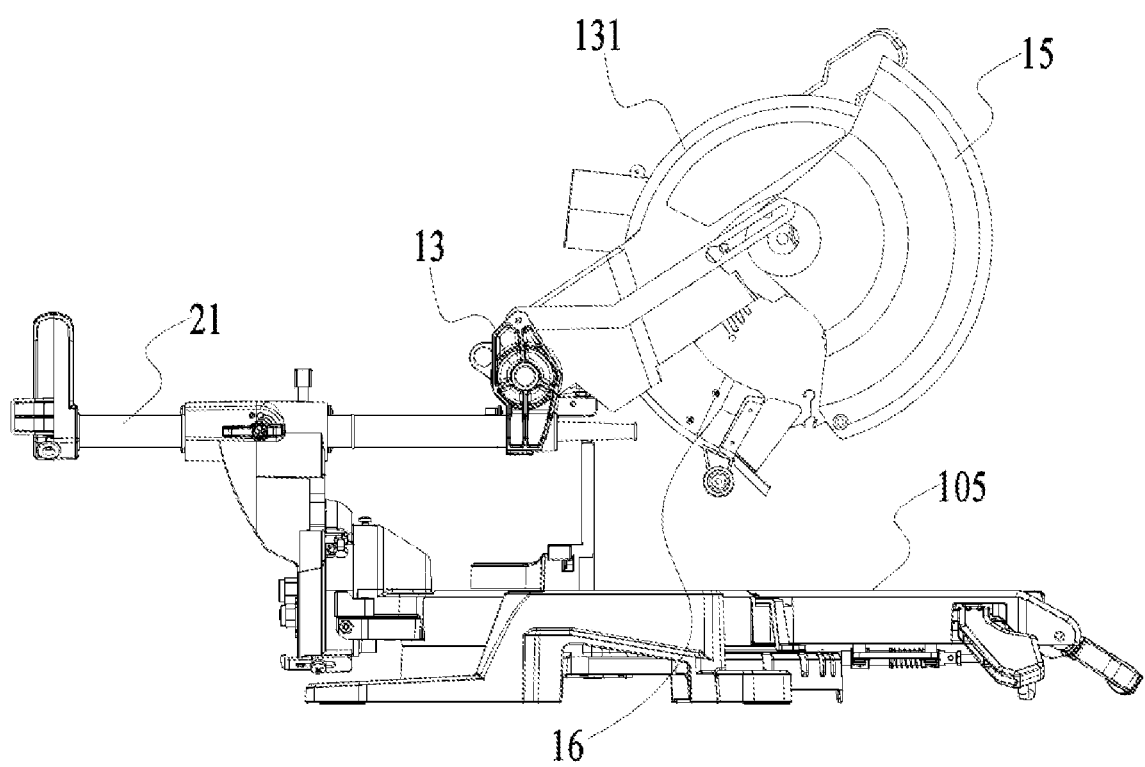
FIG. 2 is a left view of the miter saw of FIG. 1.
Figure 5:
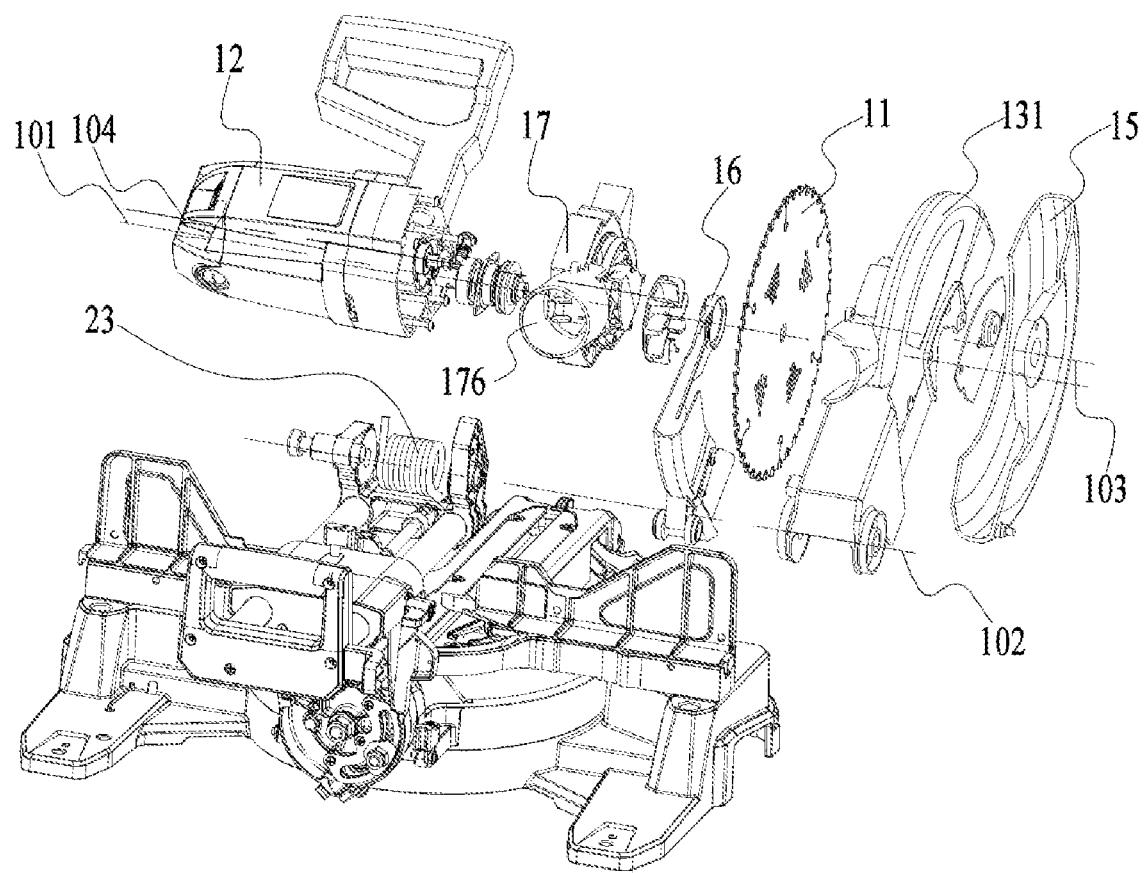
FIG. 5 is an exploded diagram of the miter saw of FIG. 1.

As illustrated in FIGS. 2 and 5, the cutting head 10 includes a cutting piece and a motor 12. The cutting piece is used for performing a cutting function of the miter saw 109, which may specifically be a circular saw blade 11. The circular saw blade 11 has a first axis 101 passing through the circular saw blade 11. The motor 12 is used for providing a power source and includes an output shaft operative to drive the circular saw blade 11 to rotate around the first axis 101, thereby enabling the circular saw blade 11 to cut the workpiece placed on the worktable 25. Specifically, the output shaft is connected to a motor shaft 104 of the motor 12 through a transmission gear. It is to be understood that the output shaft and the motor shaft are not co-linear. Furthermore, the cutting tool 100 further includes a connector 13 for connecting the cutting head 10 to the body 20. The connector 13 is rotatable around a second axis 102 relative to the body 20. The cutting head is further formed with an operating member 14 operable by the user. Specifically, when the cutting head 10 is movably connected to the body 20, the user may operate the cutting head 10 to rotate around the second axis 102. The connector 13 further extends to form a first shield 131 surrounding the circular saw blade 11. It is to be understood that the first shield 131 may also be fixedly connected to the connector 13. The first shield 131 is further connected to a second shield capable of rotating around a third axis 103. The first shield 131 always surrounds at least part of the circular saw blade 11. In an uncut state, the second shield 15 is capable of surrounding at least part of the circular saw blade 11 and prevents the circular saw blade 11 from being exposed to a range directly reachable by the user. When the user operates the cutting head 10 to rotate around the second axis 102 and to gradually approach the workpiece for the cutting operation, the second shield 15 is gradually moved away from the circular saw blade 11 around the third axis 103, so that the circular saw blade 11 is able to contact the workpiece for cutting.

In this implementation, the body 20 is connected to or formed with a guide rail 21. An intermediate member 22 is further formed between the guide rail 21 and the connector 13. The intermediate member 22 is slidably connected to the guide rail 21, the connector 13 is connected to and rotatable around the intermediate member 22, so that the cutting head 10 is operative to perform a composite motion composed of a rotation around the second axis 102 and a slide along the front-and-rear orientation. The intermediate member 22 is further connected to a restoration member 23 configured to allow the connector 13 to return to its position. Specifically the restoration member 23 may be a torsion spring.

As illustrated in FIG. 1, the worktable 25 is formed with a first channel 251 penetrating the worktable itself, the first channel 251 may be at least partially received at the bottom of the worktable 25 and formed in a first chamber 252 when the circular saw blade 11 cuts the workpiece. When the user performs the cutting operation, under the cutting action of the circular saw blade 11, the surface of the workpiece generates a large amount of chips, which may have a big impact on the environment and affecting the cutting operation by the user at the same time, so that during the operation, the cutting tool 100 is further formed with or connected to a chip discharging system for discharging the chips. As illustrated in FIGS. 5 to 8, the chip discharging system includes a first guiding member 16 and a chip discharging channel. The first guiding member 16 is inserted in the first shield and forms a substantially continuous channel. The channel constitutes a part of the chip discharging channel. When the cutting tool 100 is cutting the workpiece, the circular saw blade 11 rotates at a high speed around the first axis 101 along a first rotating direction, which creates a negative pressure inside the first shield 131. The negative pressure is able to suck away at least a portion of the chips. In addition, during the high-speed rotation, an inertial force of the circular saw blade 11 is able to take most of the chips to the chip discharging channel and discharge the chips to the outlet through the chip discharging channel. The chip discharging channel is also provided with a dust collecting hood 17 which is able to implement the best dust collection effect through adjusting the angle and the position thereof. The dust collecting hood 17 further includes a centrifugal fan 173 for discharging the chips. The dust collecting hood 17 is directly connected to a motor shaft 104 of the motor, thereby rotating in a high speed along with the motor 12. It is to be understood that a motor fan configured for dissipating heat for the motor 12 is further connected inside the motor 12 at a position adjacent to the motor 12.

Figure 6:
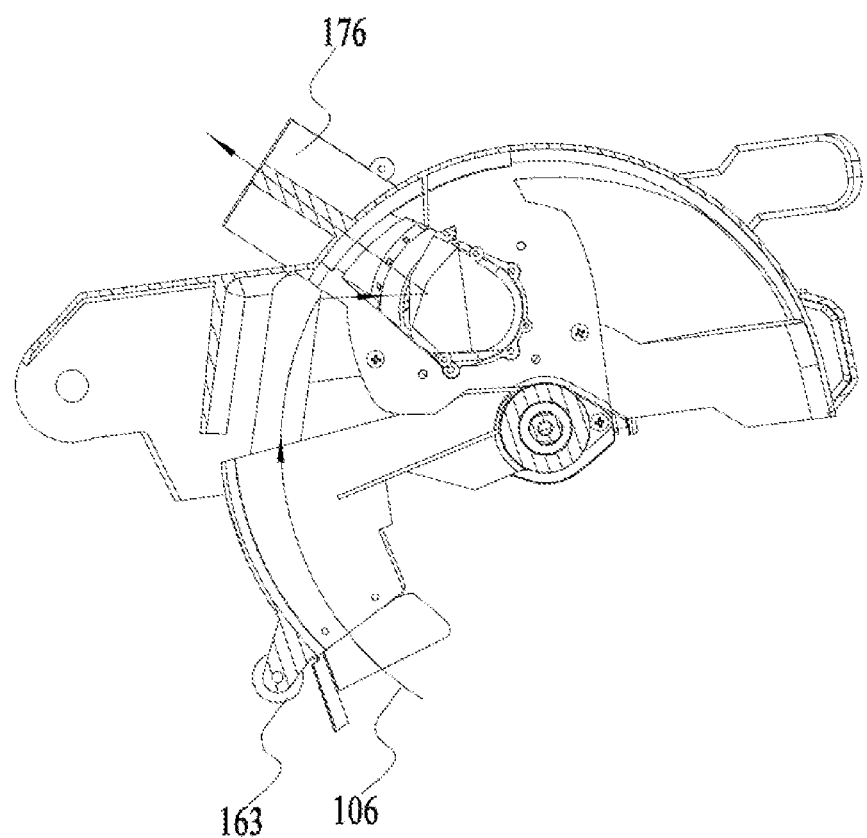
FIG. 6 is a schematic diagram of a chip discharging path of the miter saw of FIG. 4.
Figure 7:
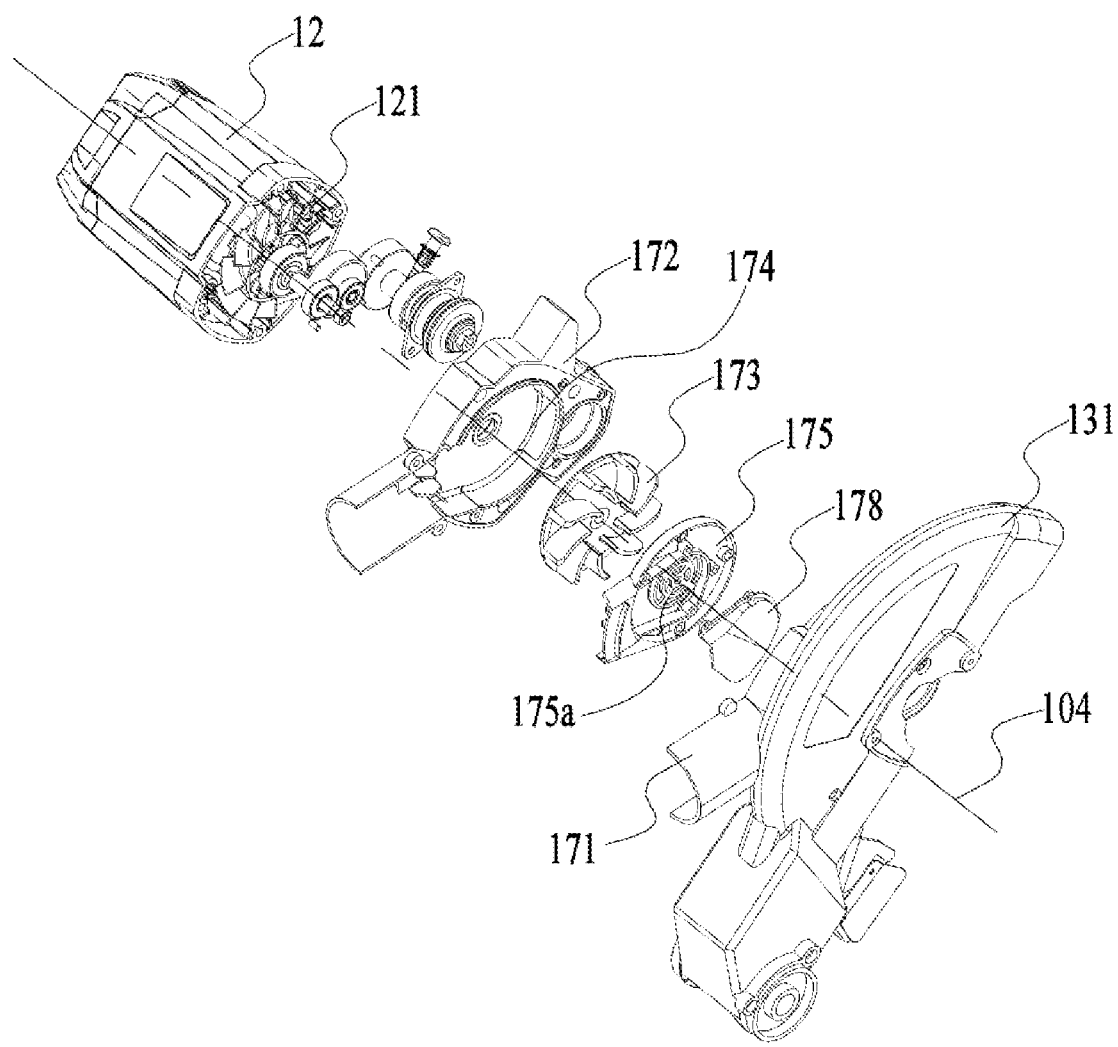
FIG. 7 is an exploded diagram of a dust collecting hood of the miter saw in FIG. 5.
Figure 8:
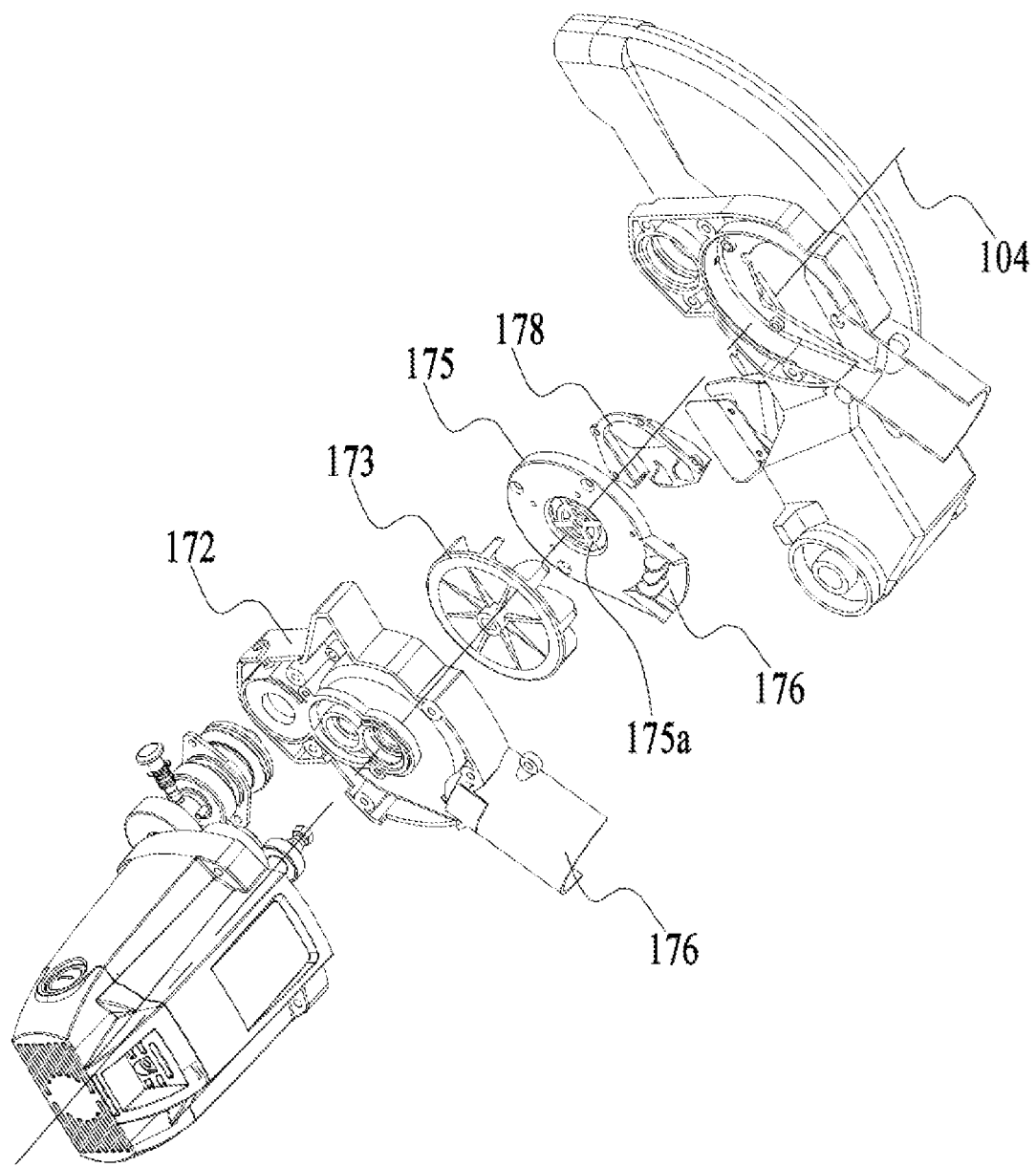
FIG. 8 is an exploded diagram of a dust collecting hood of the miter saw of FIG. 7 from another perspective.

As illustrated in FIGS. 6 to 8, paths shown by directions of arrows in the figures show a chip discharging path 106. The chips enter a first shield 131 by the guiding of the first guiding member 16, thereby entering the dust collecting hood 17, and then discharge from a dust collecting outlet 176. Along the extending direction of the motor shaft 104, the dust collecting hood 17 includes a first hood body 171 and a second hood body 172. The first shield 171 and the second hood body can be assembled to form a second receiving chamber 174, and form a dust collecting inlet 177 allowing the chips to enter through and a dust collecting outlet 176 allowing the chips to be discharged. The second receiving chamber 174 is mounted with the centrifugal fan 173, an isolation member 175, and a stop member 178. The motor shaft 104 passes through the second hood body 172 and protrudes into the second receiving chamber 174, and directly drives the centrifugal fan 173 to rotate. The isolation member 175 is formed with a through hole. A filter screen 175a allowing smaller chips to pass through is formed or mounted around this through hole. The arrangement of the filter screen 175a may prevent bigger debris from entering the second receiving chamber 174, and prevent the centrifugal fan 173 from destroying the fan during the high-speed rotation. The stop member 178 and the isolation member 175 are connected and formed into a third receiving chamber. The third receiving chamber is small and is operative to allow the chips to change direction and continuously pass through the filter screen 175a into the second receiving chamber 174 to be discharged. Along the extending direction of the motor shaft 104, the stop member 178 has an end closed and an end opened. At the opened end, the chips are allowed to enter, and at the closed end, the chips are prevented from being continuously tossed out with the circular saw blade 11. The second shield 172 is also formed with a through hole. The through hole allows the motor shaft to pass through. In this implementation, the dust collecting outlet 176 has a cylindrical shape and has two halves, one half of the dust collecting outlet is formed or connected to the second shield 172, and the other half is formed or connected to the first shield 171. The dust collecting outlet 176 is disposed on one end away from the user operation. In this implementation, the dust collecting outlet 176 is typically disposed at a rear side of the cutting head 10 shown in the figure, which facilitates a connection duct to directly discharge the chips into a receiving bag, and at the same time, enabling the user operation to not be interfered with when the chips are discharged.

The centrifugal fan 173 has wide fan blades, which are able to drive the air in the second receiving chamber 174 to flow rapidly during the rotation to form a negative pressure, so as to absorb the chips from the chip discharging channel; on the other hand, when the chip enters the second receiving chamber 174, the chips fall on the fan blades of the centrifugal fan 173, and the fan rotates at a high speed under the driving of the motor 12, so that the chips are discharged. By providing the wide fan blades, the chip discharging efficiency may be increased, at the same time, the air flow rate in the second receiving chamber 174 is increased.

Figure 9:
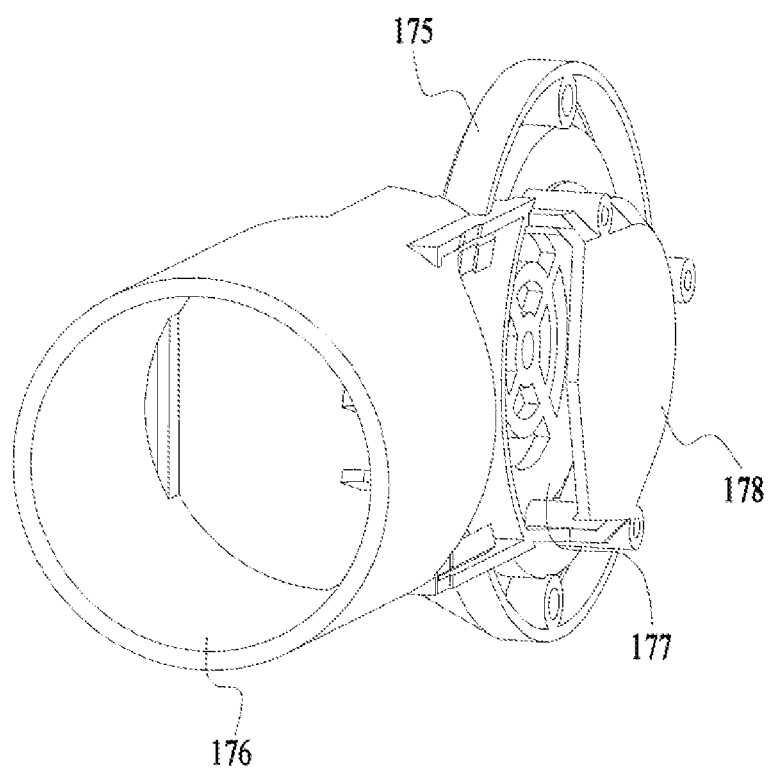
FIG. 9 is a perspective view of another implementation of a dust collecting hood of the miter saw of FIG. 5.

It is to be understood that the dust collecting outlet 176 of the dust collecting hood 17 may be integrally formed by the isolation member 175, and the first hood body 171 and the second hood body 172 of the dust collecting hood may be formed separately, or may also be separately formed on a housing of the motor 12 or a shield of the circular saw blade 11. A dust inlet and a dust outlet may be adjusted to an optimum chip discharging angle with respect to the circular saw blade 11 to effectively improve the chip discharging efficiency. FIG. 9 illustrates a dust collecting hood 17 in another implementation. An outlet of the dust collecting hood is integrally formed with a body of the dust collecting hood 17, which is more convenient for assembly. When large particles are mixed in the dust collecting hood 17 and local parts are damaged, the dust collecting hood is able to be replaced and repaired in time. By the above design, the dust collecting hood 17 has a longer service life, and higher replaceability and maintainability.

Figure 14:
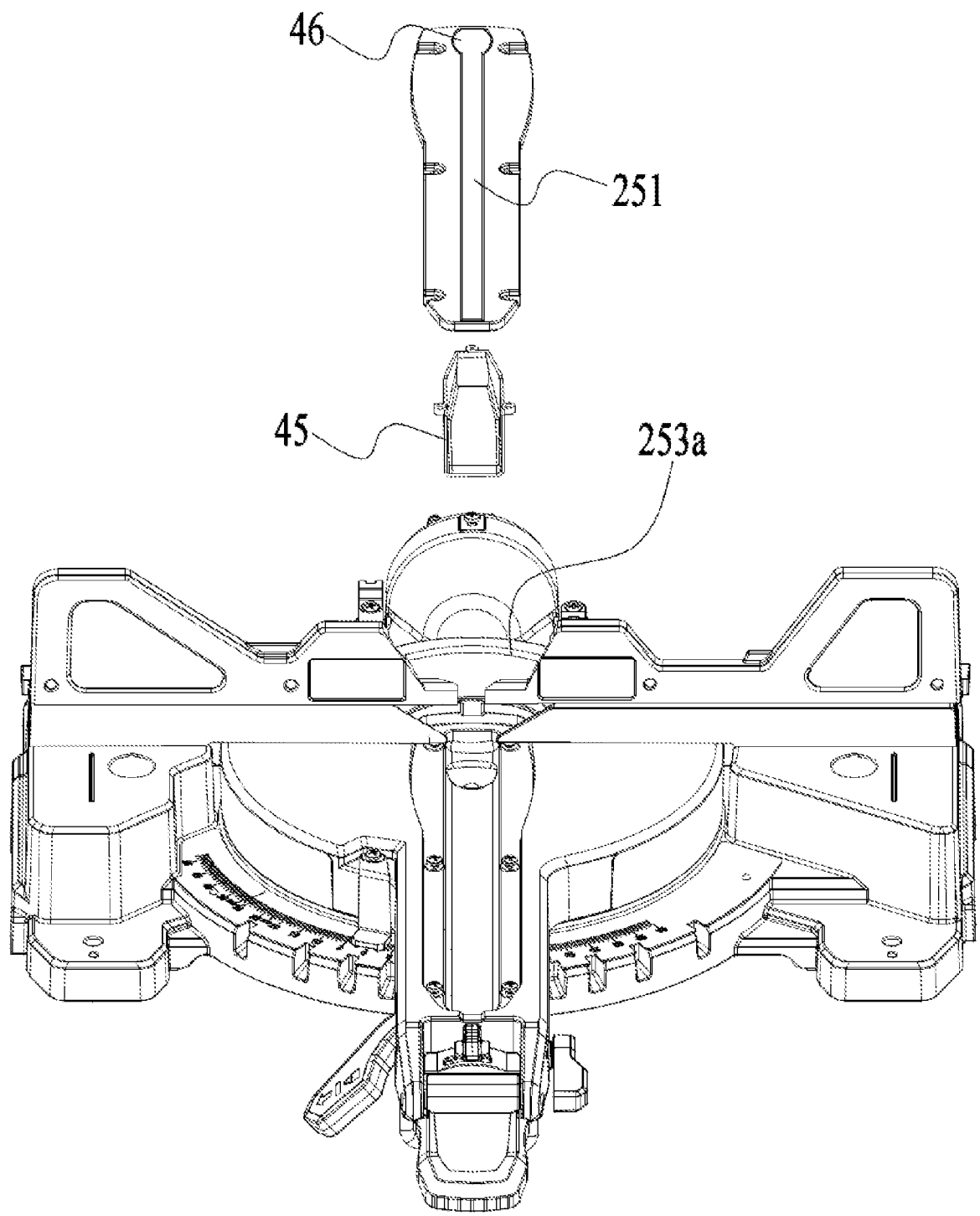
FIG. 14 is an exploded diagram at a worktable of a miter saw.

As illustrated in FIGS. 5 and 14, the worktable 25 is also connected to or formed with a fixed fence 253. In this implementation, the fixed fence 253 is typically provided with two fixed fences which are disposed symmetric to the first channel 251 on the worktable 25. An upper side of each of the two fixed fence is provided with a movable fence 254. Each movable fence 254 is able to be freely moved in a left-right orientation as shown in the figure with respect to the fixed fences 253. Typically, the fixed fences 253 form a semi-circular connection segment 253a at a rear side of the first channel 251. The connection section 253a connects the two fixed fences 253 as a whole. It is to be understood that the fixed fences 253 may be integrally formed into a preset shape.

As illustrated in FIGS. 5 to 6, in order that the first guiding member 16 is able to be always kept around the circular saw blade 11 during the process of the user operating the cutting head to cut the workpiece, the first guiding member 16 may be mounted to an output axis coaxial with the circular saw blade 11 and is able to rotate around the output axis freely and always be close to the circular saw blade 11 under the action of gravity. It is to be understood that if the first guiding member 16 is only subjected to the action of gravity, the first guiding member is attached to the circular saw blade 11, which affects the cutting of the circular saw blade 11 and may cut the first guiding member 16 when the circular saw blade 11 is rotated at a high speed for cutting operation. Therefore, a stop member 178 is disposed in a direction perpendicular to a falling direction of the first guiding member 16 subjected to gravity. The stop member 178 may be a stop pin, thereby ensuring that the first guiding member 16 and the circular saw blade 11 has a gap, and the first guiding member 16 rotates around the second axis 102 along the cutting head 10, and when the first guiding member 16 is only subjected to the gravity, it is able to always keep the same distance between the circular saw blade 11. By this design, the chips of the circular saw blade 11 during the period of cutting the workpiece are always able to be guided by the first guiding member 16 into the chip discharging channel, so that it cannot go so far that due to the position change of the circular saw blade 11, the circular saw blade 11 and the first guiding member 16 are separated and the chips are unable to be guided into the chip discharging channel. It is to be understood that when the first guiding member 16 is pressed down by the cutting head 10, the first guiding member 16 may also be rotated around a first rotating direction when the first guiding member 16 is pressed down by the cutting head 10, it can also be rotated in the first rotating direction due to a reactive force of the workpiece or the fence. In this case, the first guiding member 16 is at least partially retracted within the first shield 131 and maintains a certain distance from the circular saw blade 11.

Figure 10:
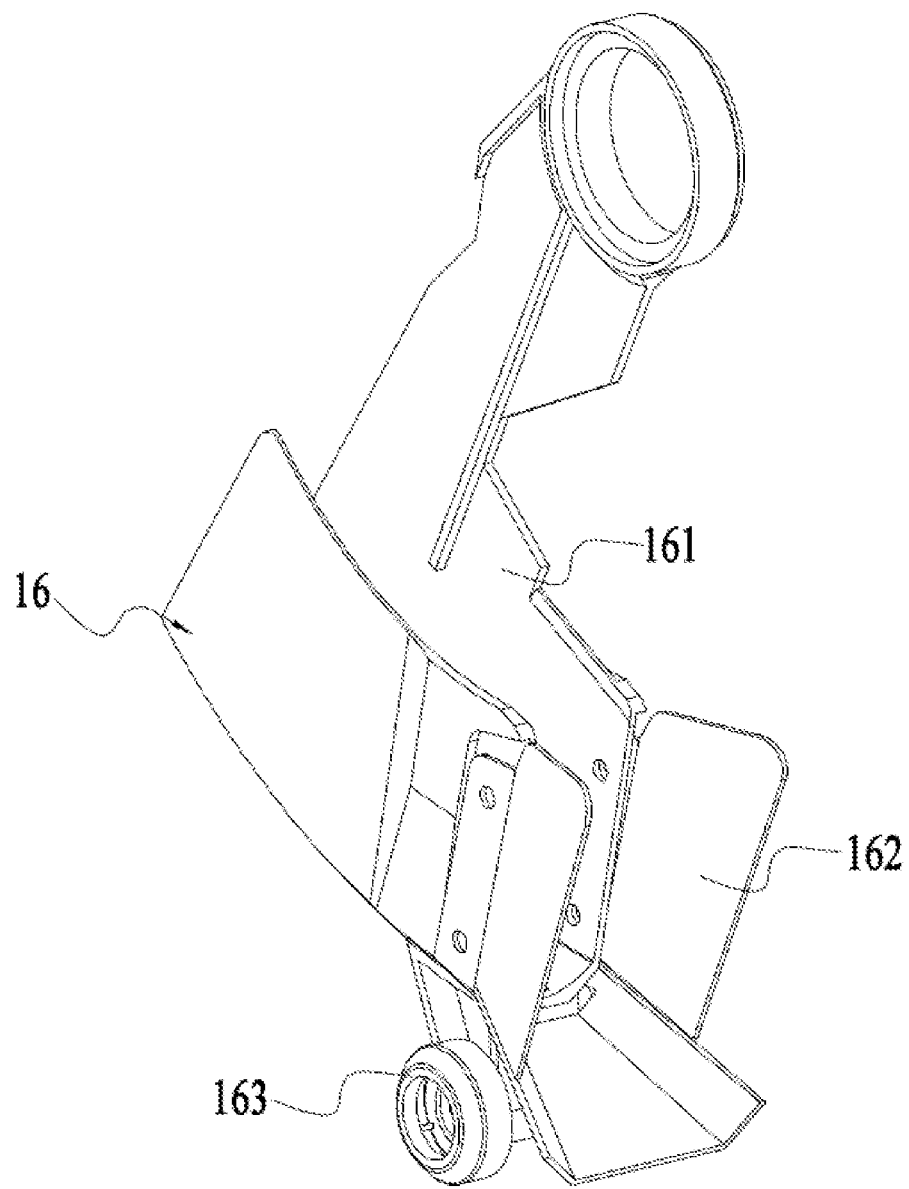
FIG. 10 is a perspective view of a first guiding member of the miter saw of FIG. 5.
Figure 11:
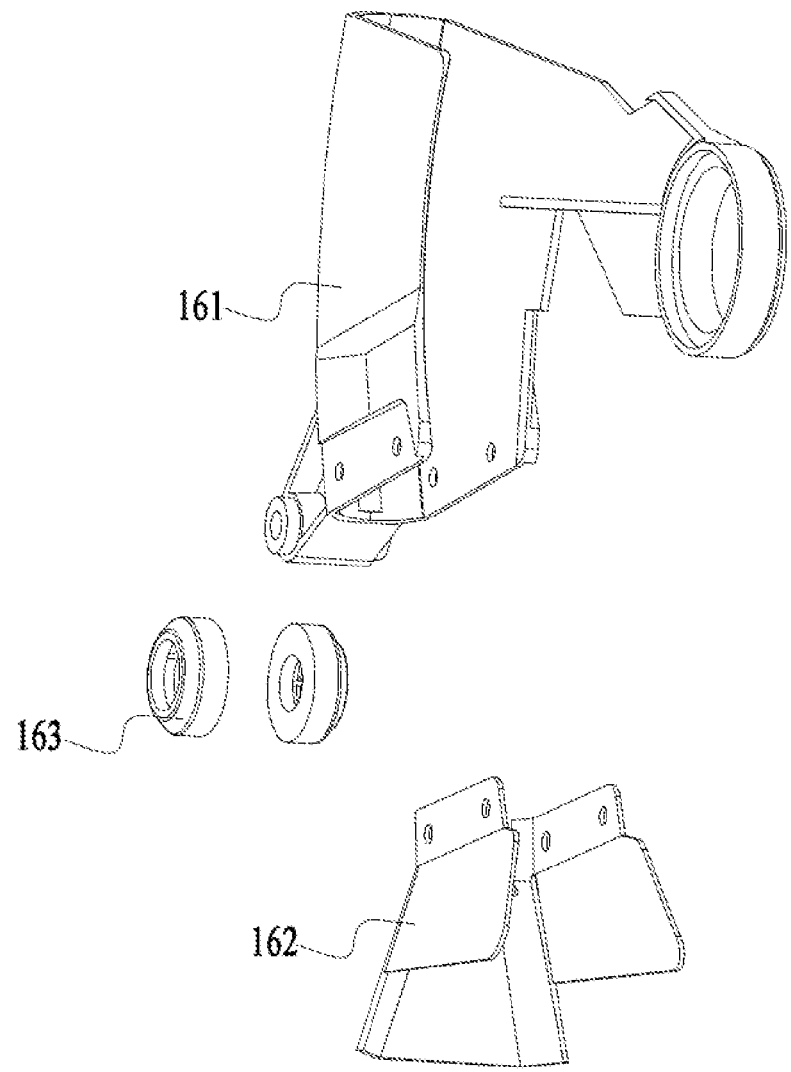
FIG. 11 is an exploded diagram of a first guiding member of the miter saw of FIG. 10.

As illustrated in FIGS. 10 and 11, the first guiding member 16 includes a main body 161, a sticking member 162, and an antifriction member. The main body 161 is formed with an interface connectable to the output axis, and a second channel is extended from the interface and substantially sticks to an inner wall of the first shield 131. The second channel includes two ends, a first end is connected to the first channel 251, a second end is connected to the sticking member 162, and the sticking member 162 may stick to the workpiece or the machine body and always be located in the direction of the chips being discharged. While rotating with the cutting head 10, the first guiding member 16 always sticks to the workpiece under the action of gravity and generates a displacement in the front-rear orientation shown in the figure. When the circular saw blade 11 cuts to the end of the workpiece and is going to detach the workpiece, in this case, since a gap exists between the first guiding member 16 and the circular saw blade 11, the first guiding member 16 firstly detaches from the workpiece and gradually crosses the movable fences 254 while getting away from the workpiece. By arranging the sticking member 162, the first guiding member 16 is enabled to substantially guide the chips to the chip discharging path 106, so that the chips are able to substantially enter the chip discharging channel from the first guiding member 16, thereby effectively preventing the chips from flying away from the worktable 25. The sticking member 162 is made of a material which has a high flexible force and is resistant to abrasion. In this implementation, the sticking member 162 is typically selected as a rubber member, and has an opening. The opening is not provided with a side wall, which facilitates sticking to the workpiece or the fence, the sticking member 162 is formed with two side walls away from the opening.

The antifriction member is disposed at the rear side of the sticking member 162 and is connected to the main body 161 of the first guiding member 16, thereby facilitating the first guiding member 16 to be able to effectively cross the movable fences 254 when the first guiding member 16 is away from the workpiece, and reducing the interactive force between the first guiding member 16 and the movable fences 254. In this implementation, the antifriction member is specifically a roller 163. It is to be understood that the main body 161 is provided with a rolling shaft connected to the roller 163. Typically, two rollers 163 are provided, and two rolling shafts are provided on the main body 161 for mounting the two rollers separately. The roller 163 and the roller shaft are arranged in pairs, and one or more pairs may be arranged, which is not repeated herein, as long as the first guiding member 16 is able to effectively cross the movable fence 254 as well as the interactive force between the first guiding member 16 and the movable fence 254 is reduced.

Figure 3:
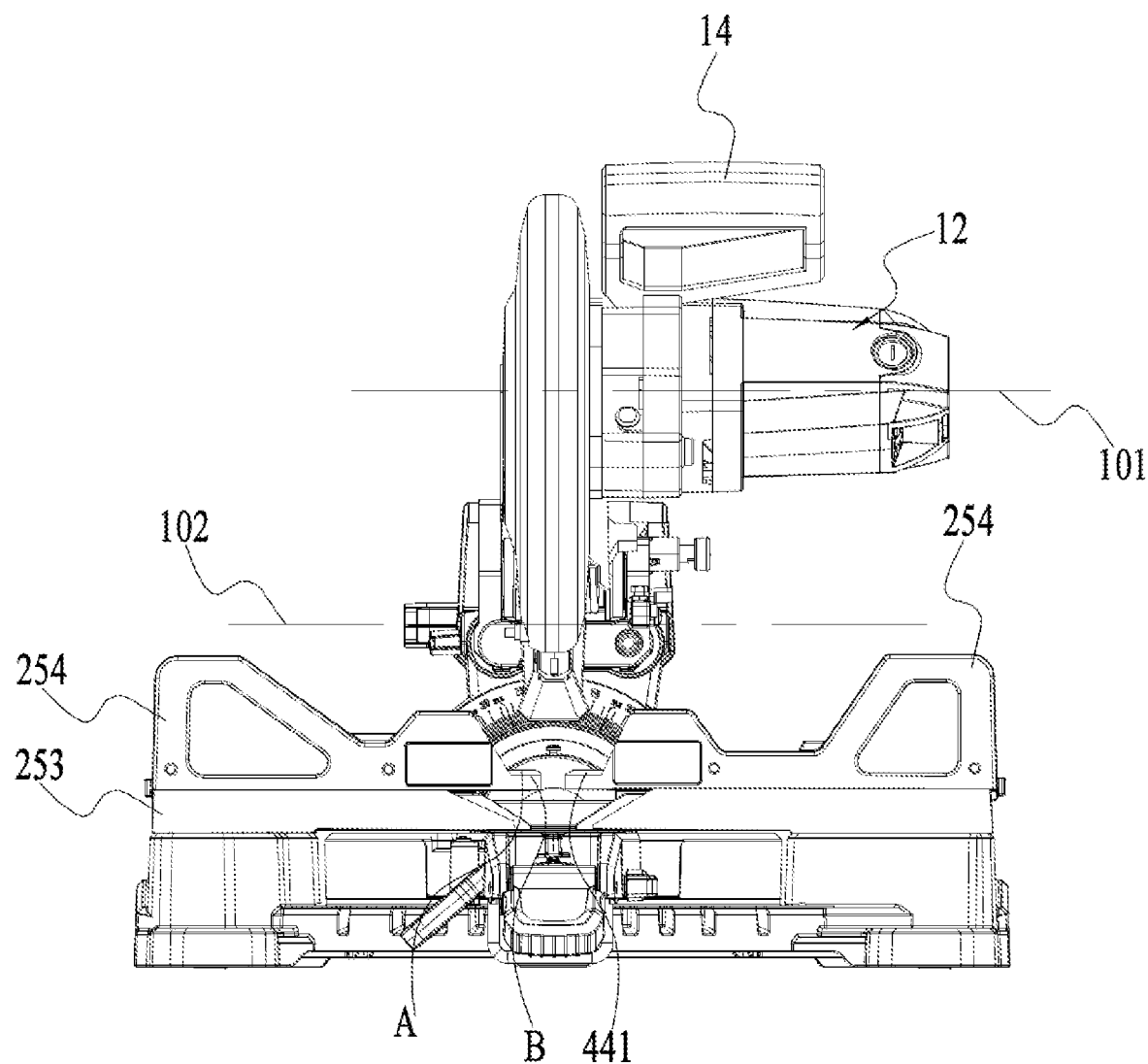
FIG. 3 is a front view of the miter saw of FIG. 1.
Figure 4:
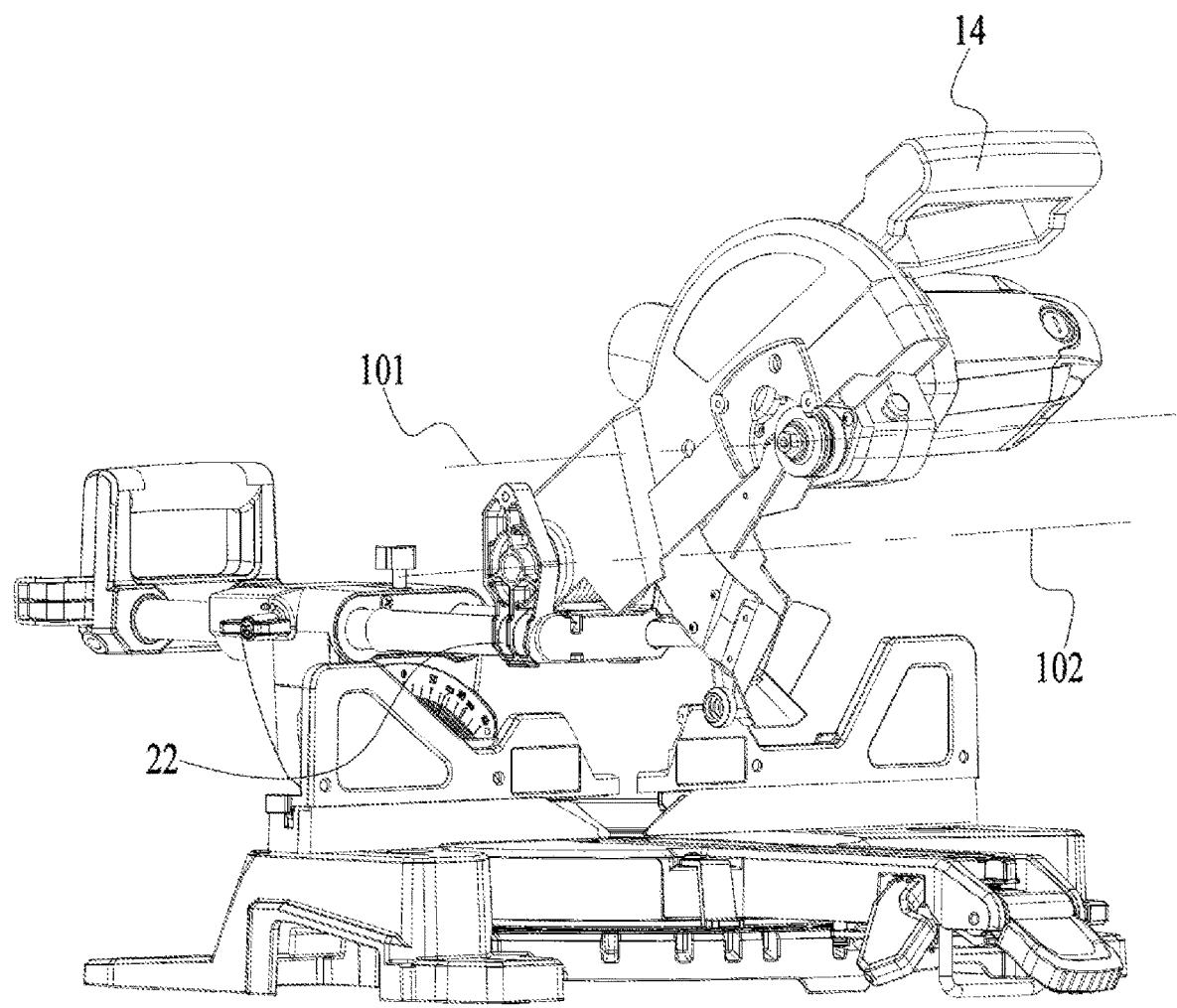
FIG. 4 is a perspective view of the miter saw of FIG. 1 with a cutting piece and a movable shield removed.

As illustrated in FIG. 3, the movable fence 254 is also formed with a guiding portion 441 allowing the roller 163 to slide. It is to be understood that the guiding portion 441 may be a sloping surface or a curved surface or be another guiding portion 441 convenient for the roller 163 to cross. When the guiding portion 441 is a sloping surface, the guiding portion 441 obliquely contacts the roller 163. When the guiding portion 441 is a curved surface, the guiding portion 441 and the roller 163 are substantially externally tangent to each other. In this implementation, the guiding portion 441 typically adopts the sloping surface. In an up-down orientation, the guiding portion 441 has a highest point A and a lowest point B with respect to the working plane.

Figure 12:
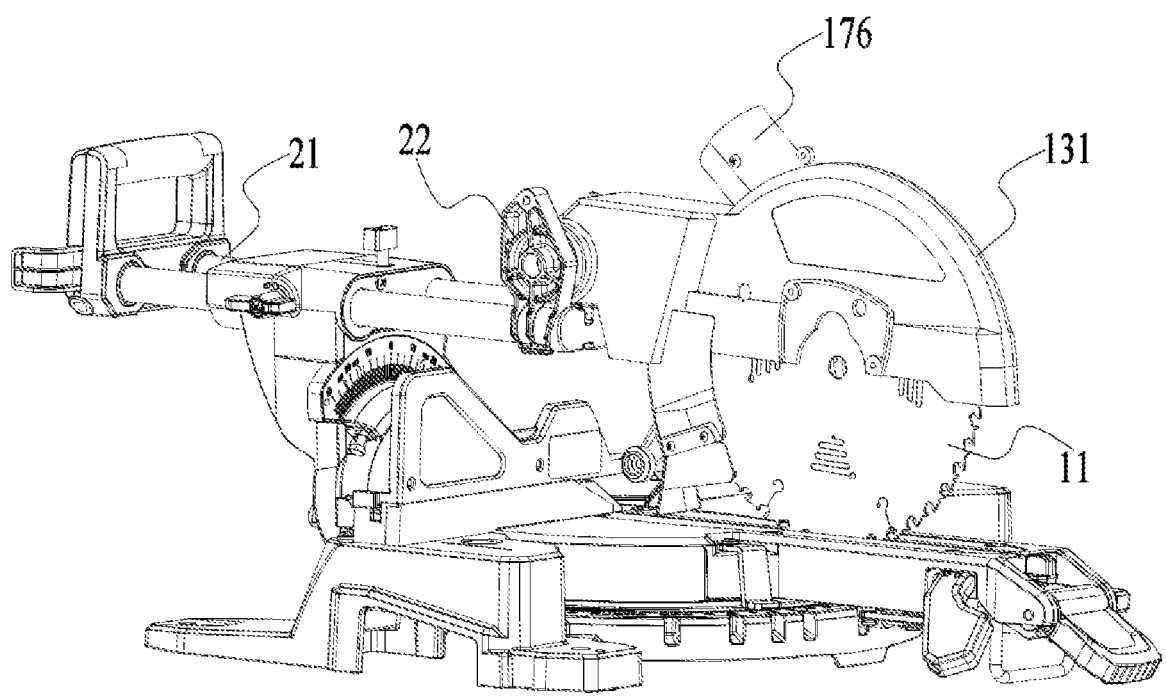
FIG. 12 is a perspective view of the cutting head of FIG. 1 rotated to a limit position.
Figure 13:
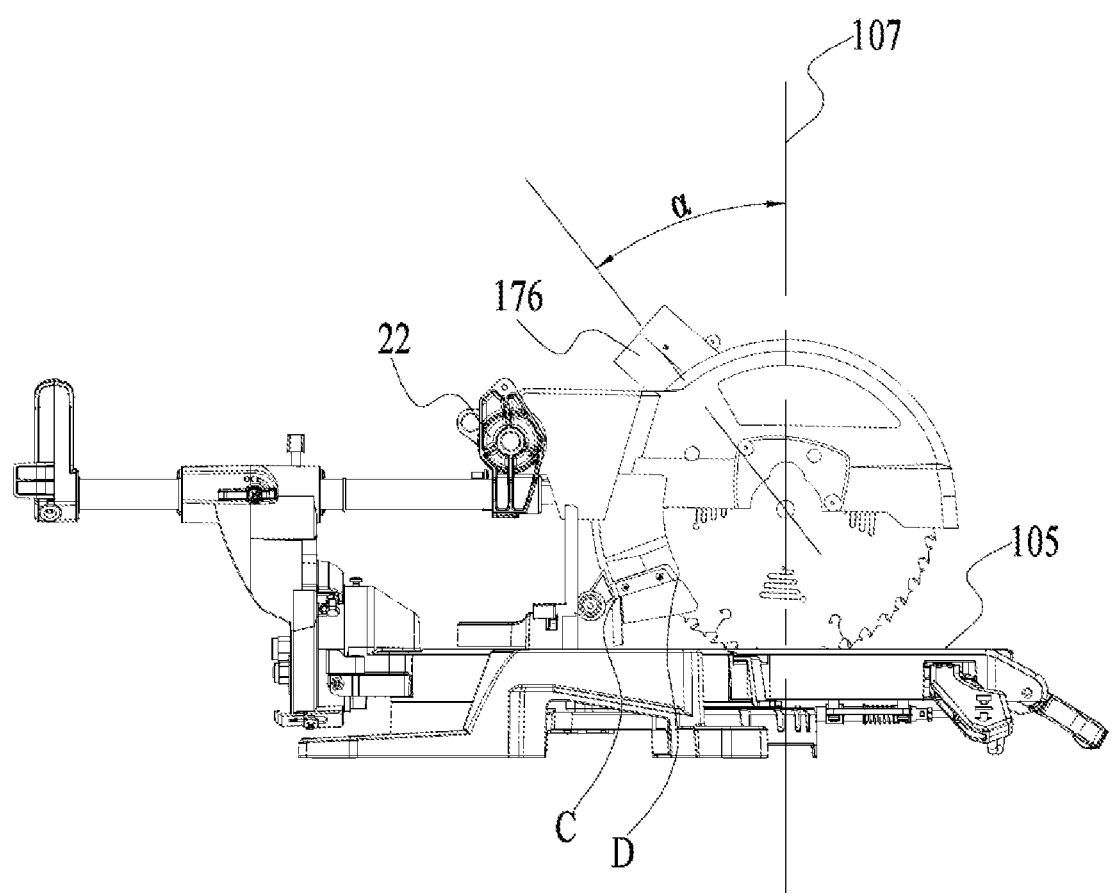
FIG. 13 is a left view of the cutting head of FIG. 1 rotated to the limit position.

As illustrated in FIGS. 12 to 13, when the cutting head 10 rotates around the second axis 102 to a limit position, i.e., when the circular saw blade 11 is pressed down to the lowest point, in order that the first guide member more easily traverses the fence and that the first guiding member 16 and the fence achieve a better cooperating state thus achieving a higher chip discharging efficiency, the following situations are provided in the vertical orientation: when a distance between a center of the roller 163 and the worktable plane 105 is less than or equal to a quarter of a diameter of the circular saw blade 11, the center of the roller 163 is located at a lower edge of the main body 161 of the first guiding member 16, and a lowest end of an outer diameter of the roller 163 is lower than the lower edge of the main body 161. In addition, in the front-rear orientation, the lower edge of the main body 161 includes a lowest point C and a highest point D, the distance between the center of the roller 163 and the worktable plane 105 is less than or equal to a distance between the highest point D and the worktable plane 105. When the guiding portion includes a highest point A and a lowest point B in the front-and-rear orientation, the center of the roller 163 is higher than the highest point A of the guiding portion 441. When a distance between the center of the roller 163 and the highest point A of the guiding portion 441 is greater than or equal to ⅛ of the outer diameter of the roller 163 and is less than or equal to a half the outer diameter of the roller 163, the center of the roller 163 is located at the lower edge of the main body 161 of the first guiding member 16, and a lowest point of the outer diameter of the roller 163 is higher than the lowest point D of the first guiding member 16, the distance between the roller 163 and the worktable plane 105 is less than or equal to a quarter of the diameter of the circular saw blade 11. According to the safety requirements, when the movable fences 254 near each other to a closest distance of 18*mm*, the first guide member 16 can still cross the guiding portion 441 when the cutting head 10 is at any angle with respect to the worktable plane 105.

When the cutting head 10 rotates around the second axis 102 to a limit position, i.e., when the saw blade is pressed down to the lowest point, an axis passing through the center point of the circular saw blade 11 and perpendicular to the worktable plane is defined as a reference axis, along the first rotating direction, when an included angle α between a line connecting a center of the centrifugal fan 173 to a center of the circular saw blade 11 and the reference axis 107 is greater than or equal to 0° and less than or equal to 45°, the dust removal effect of the dust collecting hood 17 is better. Typically, when the included angle α reaches 30°, the dust collecting hood 17 achieves the optimal dust removal effect.

As illustrated in FIG. 14, when the circular saw blade 11 is cutting the workpiece, a portion of the chips may fall into the first receiving chamber 252 at the bottom of the worktable 25 through the first channel 251, thus the cleaning is extremely difficult. In this implementation, the worktable 25 is formed or mounted with a second guiding member 45 in the first receiving chamber 252 at the bottom of the worktable that guides the chips to be discharged from the first receiving chamber 252. The first channel 251 of the worktable 25 is located at a front side of a connection segment 253*a* of the fixed shield and is provided with a larger chip outlet 46. The chip outlet 46 is able to correspond to the first guiding member 16 after the first guiding member 16 crosses the movable shield. The chips in the first receiving chamber may be sucked in the first guiding member 16 by the chip outlet 46, and discharged by the chip discharging channel. Specifically, the second guiding member 45 is a sloping surface in the front-rear orientation. In the direction from the front to the rear, the sloping surface is gradually raised to a preset height from low to high, so as to achieve the purpose of quickly discharging the chips in the first receiving chamber 252.

The foregoing illustrates and describes basic principles, main features and advantages of the present disclosure. It is to be understood by those skilled in the art that the above embodiments do not limit the present disclosure in any form, and all solutions obtained by way of equivalent substitution or equivalent transformation shall all fall in the scope of protection of the present disclosure.

What is claimed is:

1. A miter saw, comprising:
a base;
a worktable arranged on the base and defining a worktable plane;
a cutting head formed with or connected to an operating member operable by a user, wherein the cutting head further comprises a circular saw blade rotatable around a first axis and a motor for driving the circular saw blade; and
a fence arranged on the worktable;
wherein the cutting head is connected with a first guiding member configured to guide chips to be discharged, the fence is formed with a guiding portion, the cutting head is operative to rotate around a second axis parallel to the worktable plane, and in response to the cutting head rotating around the second axis, the guiding portion is operative to guide the first guiding member to cross the fence.

2. The miter saw of claim 1, further comprising a guide rail, arranged above the worktable and extending along a front-and-rear orientation of the worktable and capable of sliding in the font-and-rear orientation relative to the worktable and a roller disposed at a rear side of the first guiding member, wherein in response to the cutting head, which is a fixedly connected to a front end portion of the guide rail, being moved along the front-and-rear orientation of the slide rail and being rotated around the second axis relative to the worktable, the roller is operative to guide the first guiding member to cross the guiding portion.

3. The miter saw of claim 2, wherein the first guiding member comprises a main body formed with or connected with a rolling shaft connected to the roller and a sticking member, for sticking to a workpiece, fixedly connected to the main body.

4. The miter saw of claim 3, wherein, when a distance of a center of the roller from the worktable plane is less than or equal to a quarter of a diameter of the circular saw blade, the center of the roller is located at a lower edge of the main body, and a lowest end of an outer diameter of the roller is lower than the lower edge of the main body.

5. The miter saw of claim 4, wherein in the front-and-rear orientation, the lower edge of the main body comprises a lowest point C and a highest point D and the distance between the center of the roller and the worktable plane is less than or equal to a distance between the highest point D and the worktable plane.

6. The miter saw of claim 5, wherein the guiding portion comprises a highest point A and a lowest point B in a vertical orientation and the center of the roller is higher than the highest point A.

7. The miter saw of claim 6, wherein, in response to a distance between the center of the roller and the highest point A being greater than or equal to ⅛ of the outer diameter of the roller and less than or equal to a half of the outer diameter of the roller, the center of the roller is located at the lower edge of the main body, a lowest point of the outer diameter of the roller is higher than the lowest point D, and the distance between the roller and the worktable plane is less than or equal to a quarter of the diameter of the circular saw blade.

8. The miter saw of claim 1, wherein the cutting head further comprises a fixed shield at least partially surrounding the circular saw blade and a movable shield that is movably connected to the fixed shield and that at least partially surrounds the circular saw blade.

9. The miter saw of claim 8, wherein the guiding portion is formed on the movable shield and is provided with a slope deviating from a direction perpendicular to the worktable plane.

10. The miter saw of claim 8, wherein the fixed shield and the first guiding member constitute a chip discharging channel at least partially configured for discharging the chips.

11. The miter saw of claim 10, wherein the chip discharging channel is further connected to or formed with a dust collecting hood configured for discharging the chips.

12. The miter saw of claim 11, wherein the dust collecting hood is formed with or connected to a filter screen operative to filter the chips.

13. The miter saw of claim 1, wherein the worktable is formed with a channel and the channel defines a chip outlet at the fence that allows the chips to be discharged.

14. The miter saw of claim 13, wherein the worktable is formed with a receiving space at a lower side of the channel that is configured for receiving at least part of the chips.

15. The miter saw of claim 14, wherein a second guiding member is connected or formed in the receiving space and is configured for guiding the chips to be discharged out of the chip outlet.

16. The miter saw of claim 1, wherein the miter saw is further formed with a dust collecting channel operative to collect dust, the dust collecting channel is provided with a dust collecting hood operative to collect the dust, the cutting head further comprises a centrifugal fan connected to a motor shaft of the motor, the cutting head has a limit state when rotating around the second axis approaching the worktable, and, when the cutting head is at the limit state and an axis passing through a center point of the cutting piece and perpendicular to the worktable plane defines a reference axis, an included angle formed between a line connecting a center of the centrifugal fan to the center point of the cutting piece and the reference axis is greater than or equal to 0° and less than or equal to 45°.

17. The miter saw of claim 16, wherein the included angle between the line connecting the center of the centrifugal fan to the center of the cutting piece and the reference axis is 30°.

18. The miter saw of claim 16, wherein the dust collecting hood comprises a dust collecting inlet, a dust collecting outlet, and a first hood body and a second hood body, wherein the first hood body is coupled to the second hood body to form a receiving chamber and the centrifugal fan is received in the receiving chamber.

19. The miter saw of claim 1, wherein the miter saw is further formed with a dust collecting channel operative to collect dust, the dust collecting channel is provided with a dust collecting hood operative to collect the dust, the cutting head further comprises a centrifugal fan connected to a motor shaft of the motor, the motor shaft is further connected to a motor fan configured for dissipating heat, the motor fan is away from the centrifugal fan, the cutting head has a limit state when rotating around the second axis approaching the worktable, and, when the cutting head is at the limit state and an axis passing through a center point of the cutting piece and perpendicular to the worktable plane defines a reference axis, an included angle formed between a line connecting a center of the centrifugal fan to the center point of the cutting piece and the reference axis is greater than or equal to 0° and less than or equal to 45°.

20. The miter saw of claim 19, wherein the included angle between the line connecting the center of the centrifugal fan to the center of the cutting piece and the reference axis is 30°.

* * * * *